United States Patent [19]

Samson et al.

[11] Patent Number: 4,843,890
[45] Date of Patent: Jul. 4, 1989

[54] CORIOLIS MASS FLOW RATE METER HAVING AN ABSOLUTE FREQUENCY OUTPUT

[75] Inventors: Allan L. Samson, Berthoud; Michael J. Zolock, Longmont, both of Colo.

[73] Assignee: Micro Motion, Incorporated, Boulder, Colo.

[21] Appl. No.: 216,760

[22] Filed: Jul. 8, 1988

[51] Int. Cl.$^4$ .............................................. G01F 1/84
[52] U.S. Cl. ................................. 73/861.38; 364/510
[58] Field of Search ..................... 73/861.37, 861.38; 364/510

[56] References Cited

U.S. PATENT DOCUMENTS 4,192,184 3/1980 Cox et al. ......................... 73/861.38

Primary Examiner—Herbert Goldstein
Attorney, Agent, or Firm—Peter L. Michaelson

[57] ABSTRACT

Apparatus and accompanying methods are disclosed herein for use in a Coriolis mass flow rate meter for producing an "absolute" frequency output. This method is illustratively implemented within a microcontroller through use of various software steps, two internal timers and one external gate. The frequency signal present on this output advantageously contains a number of pulses having an approximate 50% duty cycle over a relatively wide dynamic range wherein the number of such pulses occurring during any timing interval is proportional to the measured mass flow rate but without substantially any extraneous pulses that would otherwise occur due to nested interrupt processing. As such, use of such a frequency output advantageously ensures that internally and externally maintained totalized mass flow values will not substantially diverge, if at all, over time.

18 Claims, 11 Drawing Sheets

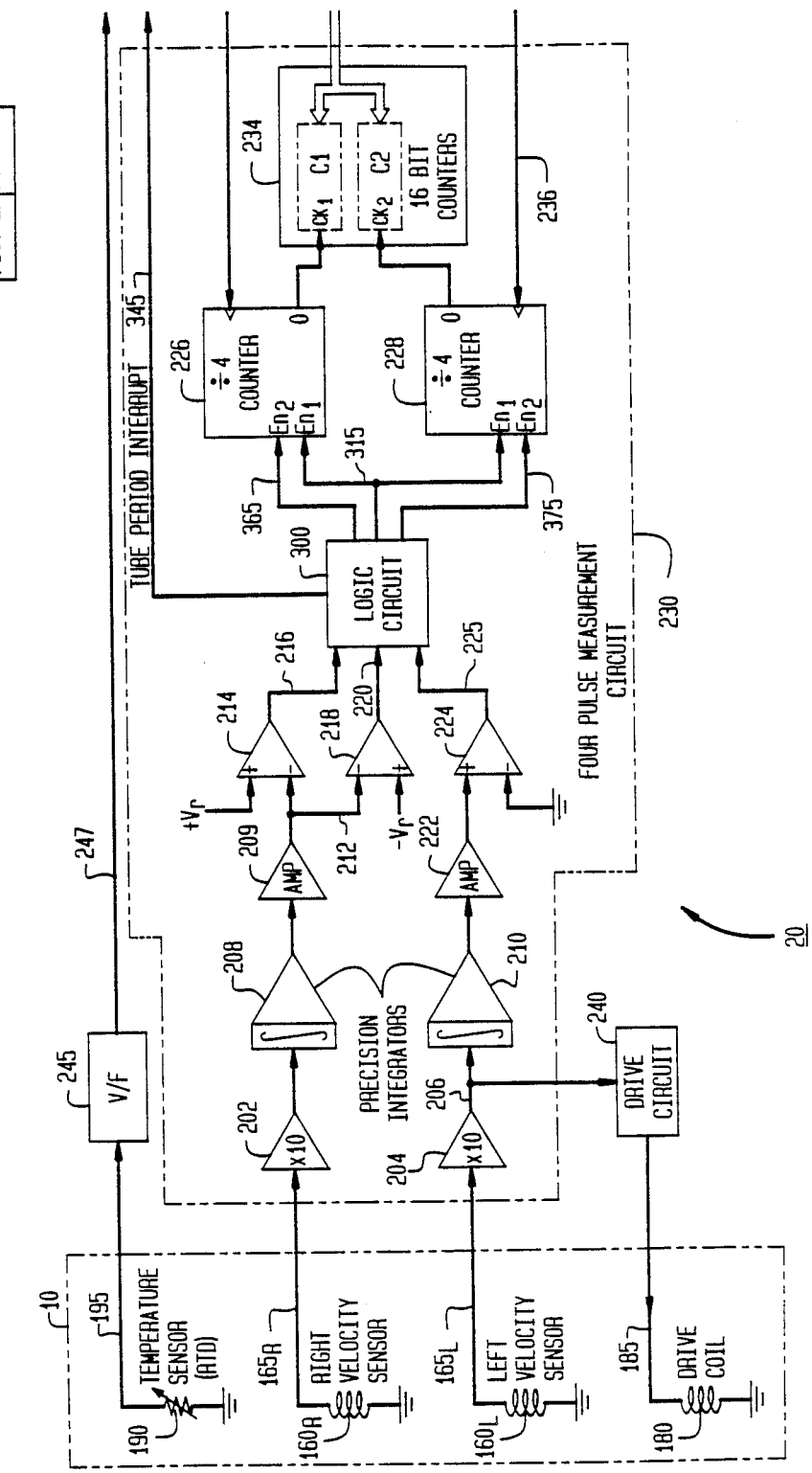

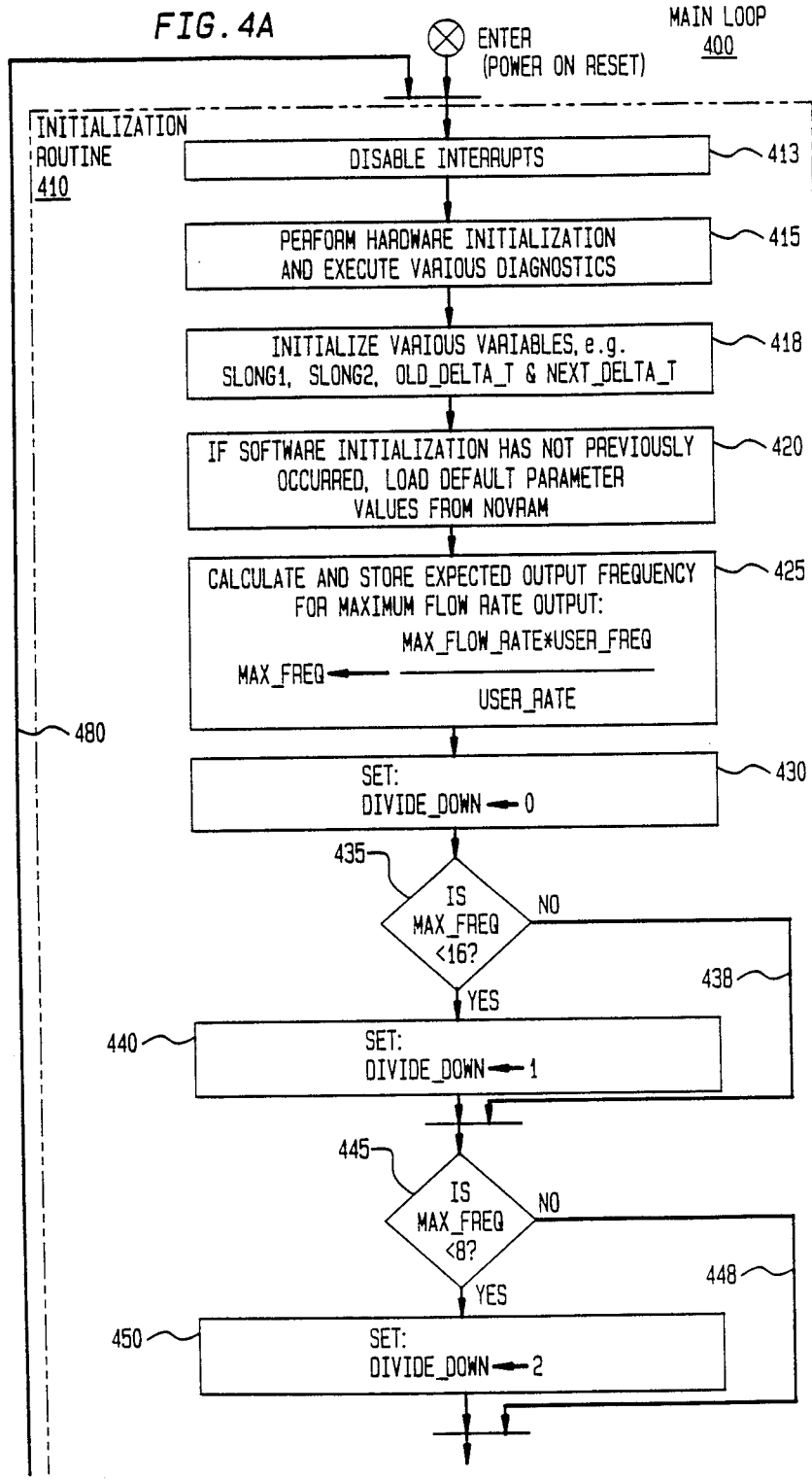

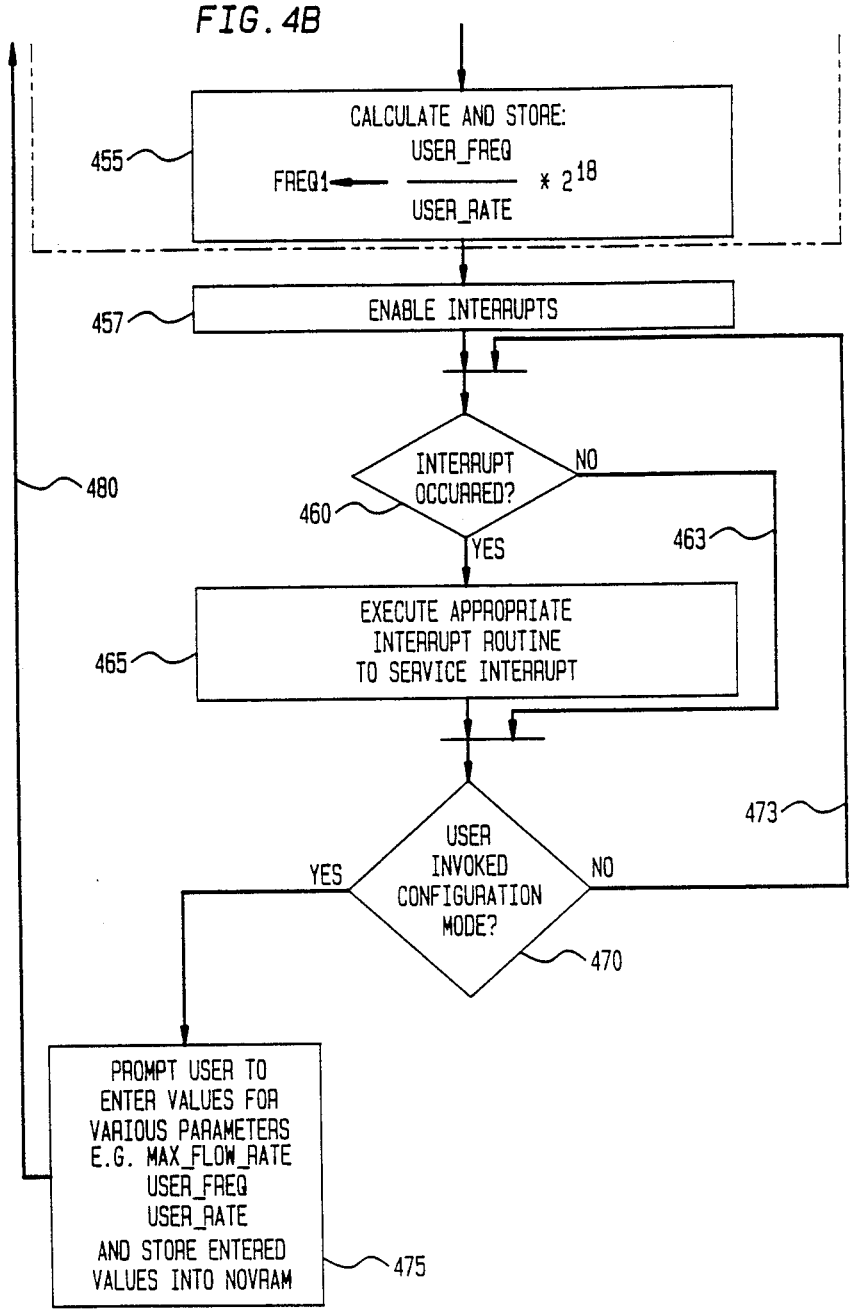

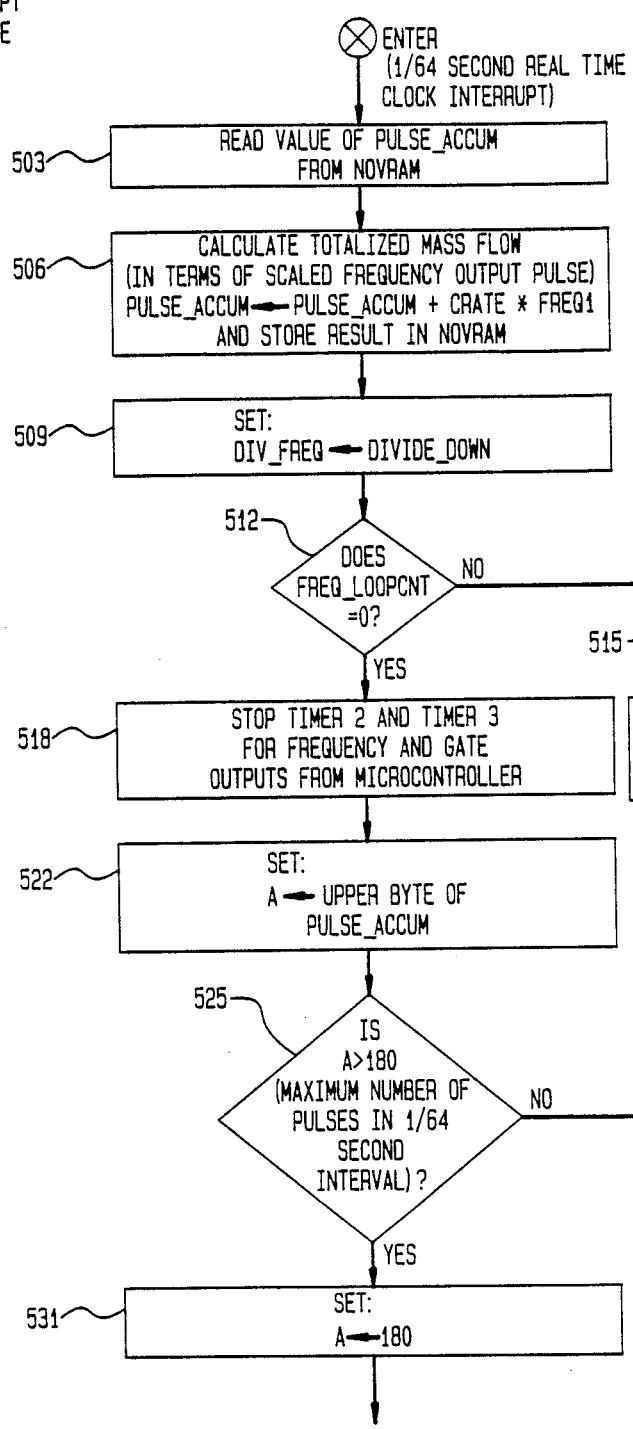

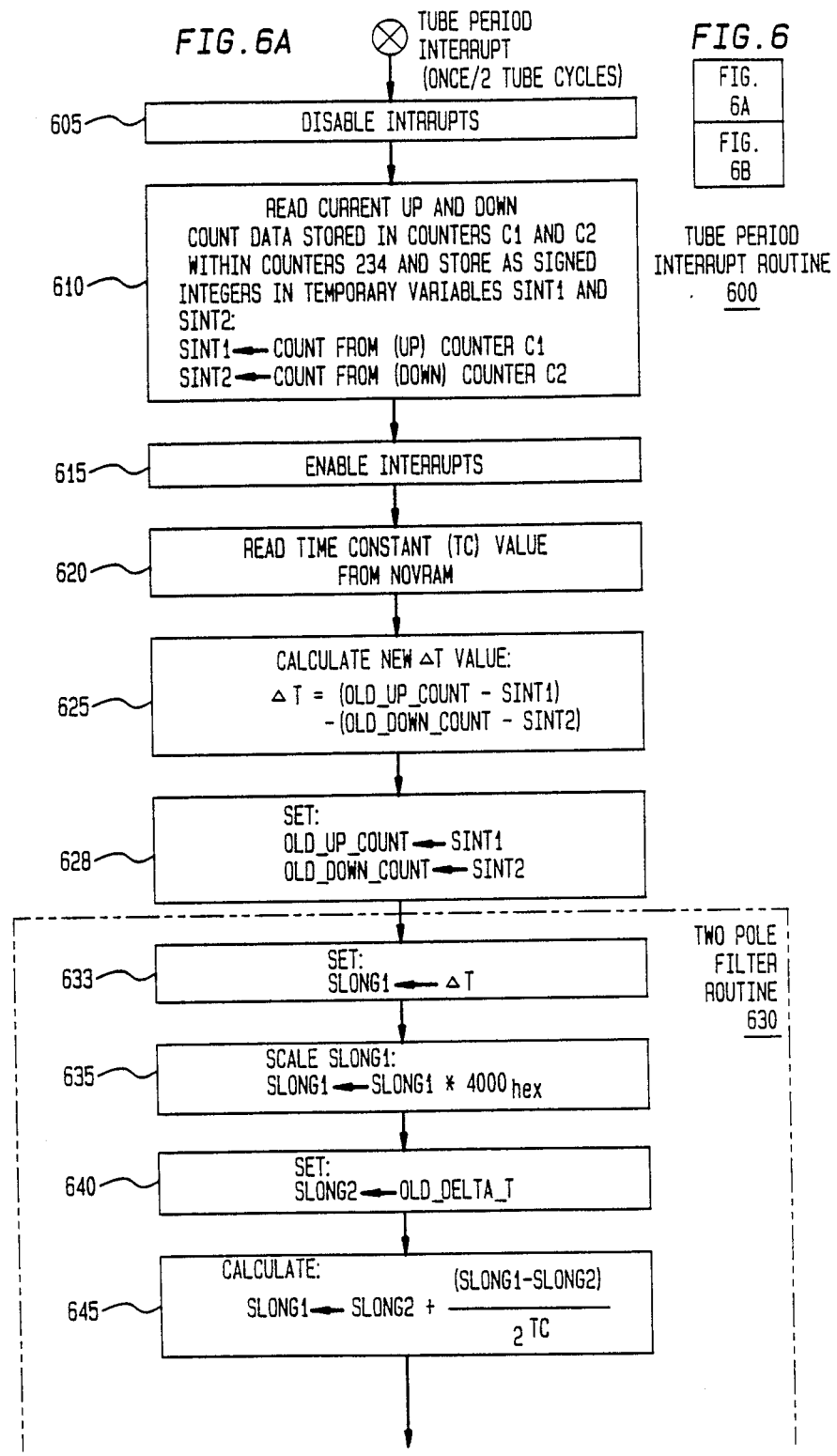

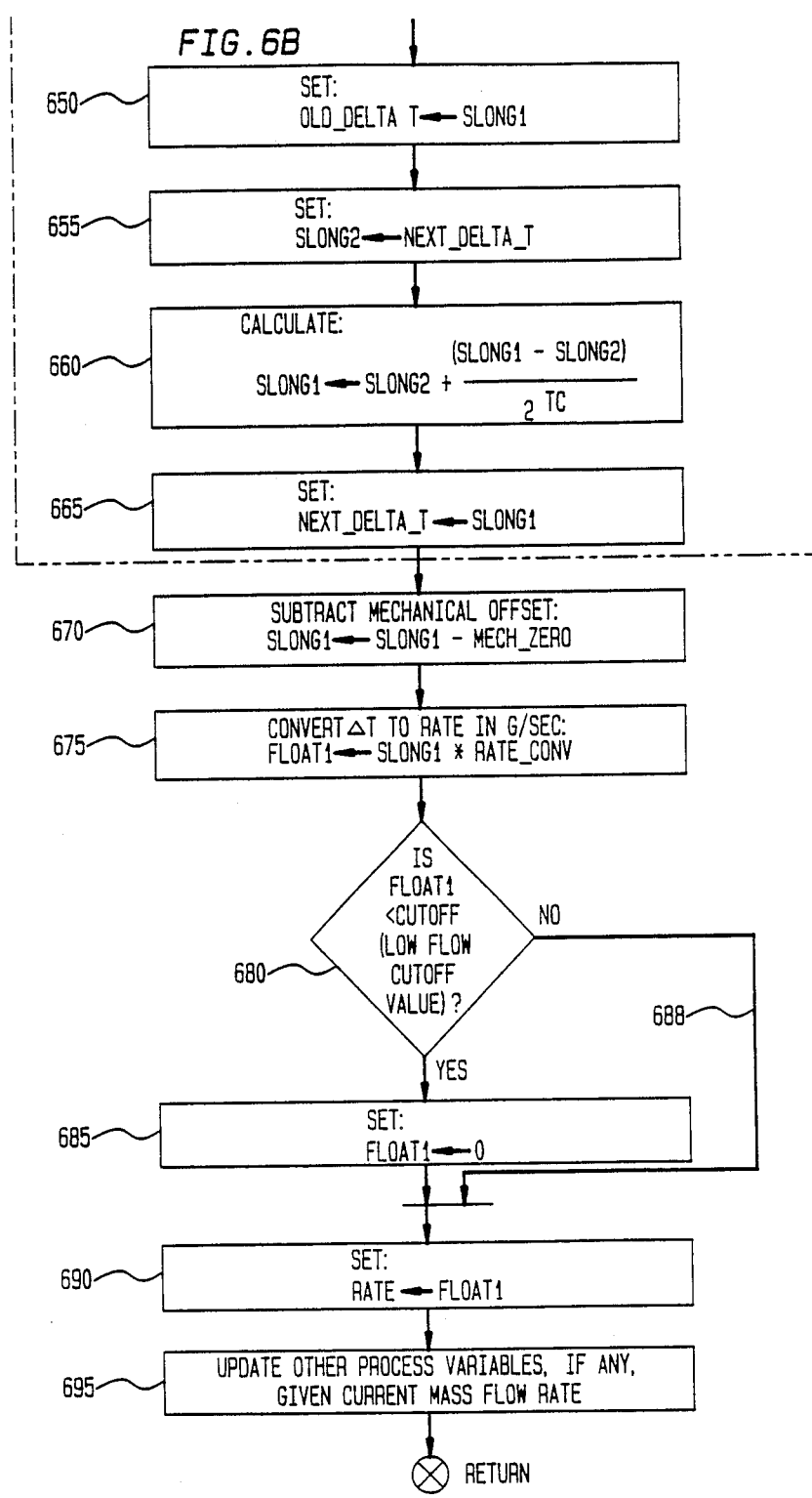

CORIOLIS MASS FLOW RATE METER HAVING AN ABSOLUTE FREQUENCY OUTPUT

CROSS REFERENCE TO RELATED APPLICATION

This application describes and claims subject matter that is also described in co-pending United States patent application entitled "CORIOLIS MASS FLOW RATE METER HAVING FOUR PULSE HARMONIC REJECTION" that has been filed simultaneously herewith, assigned Ser. No. 217,012 and has been assigned to the same assignee herein.

BACKGROUND OF THE INVENTION

1. Field of the Invention

The invention relates to apparatus and accompanying methods for use in a Coriolis mass flow rate meter for producing an absolute frequency output signal and specifically such an output signal that is proportional to measured mass flow rate.

2. Description of the Prior Art

Currently, Coriolis mass flow rate meters are finding increasing use as an accurate way to measure the mass flow rate of various process fluids.

Generally speaking, a Coriolis mass flow rate meter, such as that described in U.S. Pat. No. 4,491,025 (issued to J. E. Smith et al on Jan. 1, 1985), contains one or two parallel conduits, each typically being a U-shaped flow conduit or tube. Each flow conduit is driven to oscillate about an axis to create a rotational frame of reference. For a U-shaped flow conduit, this axis can be termed the bending axis. As process fluid flows through each oscillating flow conduit, movement of the fluid produces reactionary Coriolis forces that are orthogonal to both the velocity of the fluid and the angular velocity of the conduit. These reactionary Coriolis forces cause each conduit to twist about a torsional axis that, for a U-shaped flow conduit, is normal to its bending axis. The amount of twist imparted to the conduit is related to the mass flow rate of the process fluid flowing therethrough.

Total mass flow of a process fluid that passed through a Coriolis mass flow rate meter is readily determined by totalizing the value of the mass flow rate provided by the meter. Having an accurate measure of totalized flow is extremely important in many applications, such as custody transfer. As such and for purposes of redundancy, mass flow totalization is performed both within the meter electronics ("internal" totalization) and also remotely therefrom ("remote" totalization). Internal totalization is typically performed by a microprocessor or a similar device existing within an electronic system (the "meter electronics") that forms part of the meter. The internal totalized mass flow value is typically stored in non-volatile random access memory (NOVRAM) located within the meter electronics, appropriately updated on a periodic basis by the microprocessor and at the request of a user either locally displayed or telemetered over a communication port, e.g. a serial port, to a remote location for display. For remote totalization, the measured mass flow rate is usually provided by the meter electronics as a scaled frequency output, typically ranging from between user selected maximum and minimum frequency values that correspond to user selected maximum and minimum flow rates. This frequency output is routed to an external totalizer, such as a mechanical or electrical counter, that is mounted at a user location. Thus, if the microprocessor should fail for whatever reason thereby rendering the internal totalized mass flow inaccessible, then the totalized flow appearing on the remote totalizer can be used to provide a measure of the totalized mass flow that occurred up to the time of failure.

Ideally, the value of the totalized mass flow produced by internal totalization should always equal that produced by remote totalization. However, in practice, both totalized values have been known to diverge over time. The cause of this divergence has been traced to the circuit within the meter electronics that generates the frequency output. Hence, even though the totalized reading produced through internal totalization, i.e. by the microprocessor itself, within the meter electronics is accurate and the remotely totalized reading is the one in error, a user nevertheless remains uncertain as to which reading is truly correct: the internal totalized reading provided by the meter or the remote totalized reading that appears on the external user equipment.

Various factors are responsible for this divergence. First, many frequency output circuits provided on Coriolis mass flow rate meters utilize analog components. These circuits generally operate by applying a digitized mass flow rate value through a digital to analog (D/A) converter and from there, in scaled analog form, to a voltage to frequency (V/F) converter to yield a scaled frequency output signal. Unfortunately, D/A and V/F converters utilize analog circuitry. As such, these converters have inherent errors such as offsets, gain errors, temperature effects and the like that are typically associated with analog circuitry. Consequently, the frequency value contains an error component which, in turn, typically results in an excessive number of pulses being generated over a given time. Other frequency output circuits that are commonly used in Coriolis mass flow rate meters employ a microprocessor that loads an output value into a timer on an interrupt basis, such as once every tube oscillation cycle. The timer repeatedly decrements this value at a pre-defined clock rate such that an overflow occurs at the desired output frequency. The overflow is used as the frequency output signal. Unfortunately, in microprocessor based implementations, several interrupts are generally used by a control program executing within the meter electronics. As such, it is not uncommon that one or two other interrupts could occur in succession before the first interrupt, e.g. a tube period interrupt, was fully processed, thereby necessitating nested interrupt servicing. When this occurs, servicing of each immediately prior interrupt is suspended until the most recently occurring interrupt is fully serviced. As such, a tube period interrupt could be processed somewhat later than when it actually occurs, thereby delaying the time when the timer would otherwise be updated with a new value for the output frequency. Inasmuch as the timer is continually providing output pulses, such a delay could cause the timer to produce an extra output pulse before it has been updated.

In addition to the problem of divergence, known frequency output circuits possess additional drawbacks which limit their use in a Coriolis mass flow rate meter. First, these circuits oftentimes do not provide square pulses but rather during each timing interval produce a burst of rather narrow pulses that each have the same pulse width and which is followed by a dwell period. Ideally, the frequency output should provide square pulses with an approximately 50% duty cycle. Use of square pulses is particularly important if a remote totalizer is to be connected to the frequency output of the meter electronics. For if pulses having a duty cycle much shorter than 50% are to be used, then the remote totalizer, particularly if it is mechanical, may not have sufficient time to respond to each of the pulses. Second, frequency output circuits known in the art, particularly those that utilize a microprocessor running on an interrupt basis, have a tendency to occasionally produce a narrow extraneous pulse (commonly referred to as a "glitch"). Such a glitch can impart error into a remotely totalized count. Third, frequency output circuits known in the art are frequently unable to produce a frequency output signal that has a sufficiently wide dynamic range. Specifically, frequency output circuits can not produce pulses having a sufficiently low or high frequency thereby limiting the resolution of the frequency output signal. In particular, in an analog component based frequency output circuit, the V/F converter, due to its analog nature, has an inherently limited dynamic range. In a digital component based frequency output circuit, a sixteen bit timer is frequently used. Unfortunately, a resolution of $2^{16}$ which equals approximately 1 part out of 65,000 is generally insufficient to provide adequately low pulse rates for most applications that involve measurement of low mass flow rates. If two such timers are used in series, then sufficient resolution occurs but at the added cost of a second counter. Now, to increase the maximum pulse rate of the frequency output signal, the clock frequency that is applied to these timers can be increased. However, increasing the clock frequency for a given sized timer also increases the minimum pulse rate of the frequency output signal. As such, frequency output circuits known in the art disadvantageously possess a restricted dynamic range. Lastly, frequency output circuits known in the art tend to be quite complex and costly thereby increasing the manufacturing cost and sales price of the Coriolis mass flow rate meter.

Consequently, a need exists in the art for apparatus and accompanying methods to produce a frequency output, particularly for use in a Coriolis mass flow rate meter, that is accurate and has a sufficiently wide dynamic range. Furthermore, such an output should provide square frequency output pulses and be substantially free of any glitches. In addition, the apparatus used to provide such a output should be relatively simple and inexpensive. Use of such apparatus and methods will advantageously ensure that the totalized mass flow readings produced internally within the meter will at all times substantially match those that are produced remotely therefrom.

SUMMARY OF THE INVENTION

An object of the present invention is to provide apparatus and methods for use therein that generate an accurate mass flow rate frequency output signal for use in a Coriolis mass flow rate meter.

A specific object is to provide such a signal which, when remotely totalized, will produce a mass flow reading that will, over time, track and not substantially diverge from an totalized reading that has been internally generated within the Coriolis mass flow rate meter.

Another object is to provide such a signal that has square pulses, i.e. pulses with an approximately 50% duty cycle, and is substantially free of any glitches.

A further object is to provide such a signal that has a sufficiently wide dynamic range over a desired range of mass flow rates.

An additional object is to provide such apparatus that is relatively simple and inexpensive to manufacture.

These and other objects are provided in accordance with the teachings of the present invention by a Coriolis mass flow rate meter that has means for determining, in response to the measured mass flow rate value, a corresponding number of output pulses that need to be produced during a current timing interval; means for totalizing the number with prior values thereof to yield a totalized pulse count value wherein the totalized pulse count value has a first portion and a remainder portion; a look-up table containing a plurality of first and second timing values, wherein each of the first timing values defines an "on" time for each of the output pulses to be produced during a timing interval and each of the second values defines an "on" time for a gate interval that is sufficiently long to encompass the number of output pulses to be produced during the timing interval; means operative in response to the value of the first portion for accessing one of the first values and a corresponding one of the second values from the look-up table to yield first and second timing values; and means, responsive to the first and second timing values, for successively producing a stream of substantially square pulses as the output pulses on the frequency output signal during the gate interval occurring during the current timing interval, whereby the stream does not contain substantially any extraneous pulses.

In accordance with a preferred embodiment of the invention, the stream of output pulses is produced by using two internal timers within a microcontroller wherein one timer is set to produce a sequence of output pulses, wherein each pulse has a pre-defined "on" time, and a second timer is set to produce an output pulse having an "on" time equal to the gate interval. Both timers are loaded with new values at the beginning of each timing interval and then instructed on essentially a simultaneous basis to begin timing throughout the remainder of the interval. Each timing interval is typically 1/64 second and established on an interrupt basis using a real-time clock. The pulses produced by both timers are then gated through an external AND gate using the output of the second timer as a gate signal. By virtue of this gating, the AND gate advantageously prevents the occurrence of any extraneous output pulses that would be generated through delays encountered through nested interrupt processing from being applied to the frequency output signal. In addition, by maintaining a remainder in the totalized pulse count value and utilizing the non-remainder portion to establish the number of pulses to be produced during the current timing interval, the cumulative number of output pulses produced on the frequency output signal will advantageously match the number used to form the internally totalized mass flow reading thereby ensuring that the internally and externally totalized mass flow readings do not substantially diverge, if at all, over time.

BRIEF DESCRIPTION OF THE DRAWINGS

The teachings of the present invention may be clearly understood by considering the following detailed description in conjunction with the accompanying drawings, in which:

FIG. 2 depicts the correct alignment of the drawing sheets for FIGS. 2A and 2B;

FIGS. 2A and 2B collectively show a block diagram of meter electronics 20 interfaced to Coriolis mass flow rate meter 10 both shown in FIG. 1;

FIG. 4 depicts the correct alignment of the drawing sheets for FIGS. 4A and 4B;

FIGS. 4A and 4B collectively show a flowchart of Main Loop 400 that is executed by microcontroller 250 shown in FIGS. 2A and 2B;

FIG. 5 depicts the correct, alignment of the drawing sheets for FIGS. 5A and 5B;

FIGS. 5A and 5B collectively depict a flowchart of 64 Hz Interrupt Routine 500 that is executed as part of Main Loop 400;

FIG. 6 depicts the correct alignment of the drawing sheets for FIGS. 6A and 6B;

FIGS. 6A and 6B collectively depict a flowchart of Tube Period Interrupt Routine 600 that is executed as part of Main Loop 400.

To facilitate understanding, identical numerals have been used wherever possible to designate identical elements that are common to the figures.

DETAILED DESCRIPTION

After reading the following detailed description, those skilled in the art will quickly realize that the inventive apparatus and methods for producing an absolute frequency output signal is applicable to any measuring and/or controlling device that produces a frequency output signal that will be remotely totalized. However, for the purposes of brevity, the invention will be discussed in the context of a Coriolis mass flow rate meter.

A. Hardware

Figure 1:
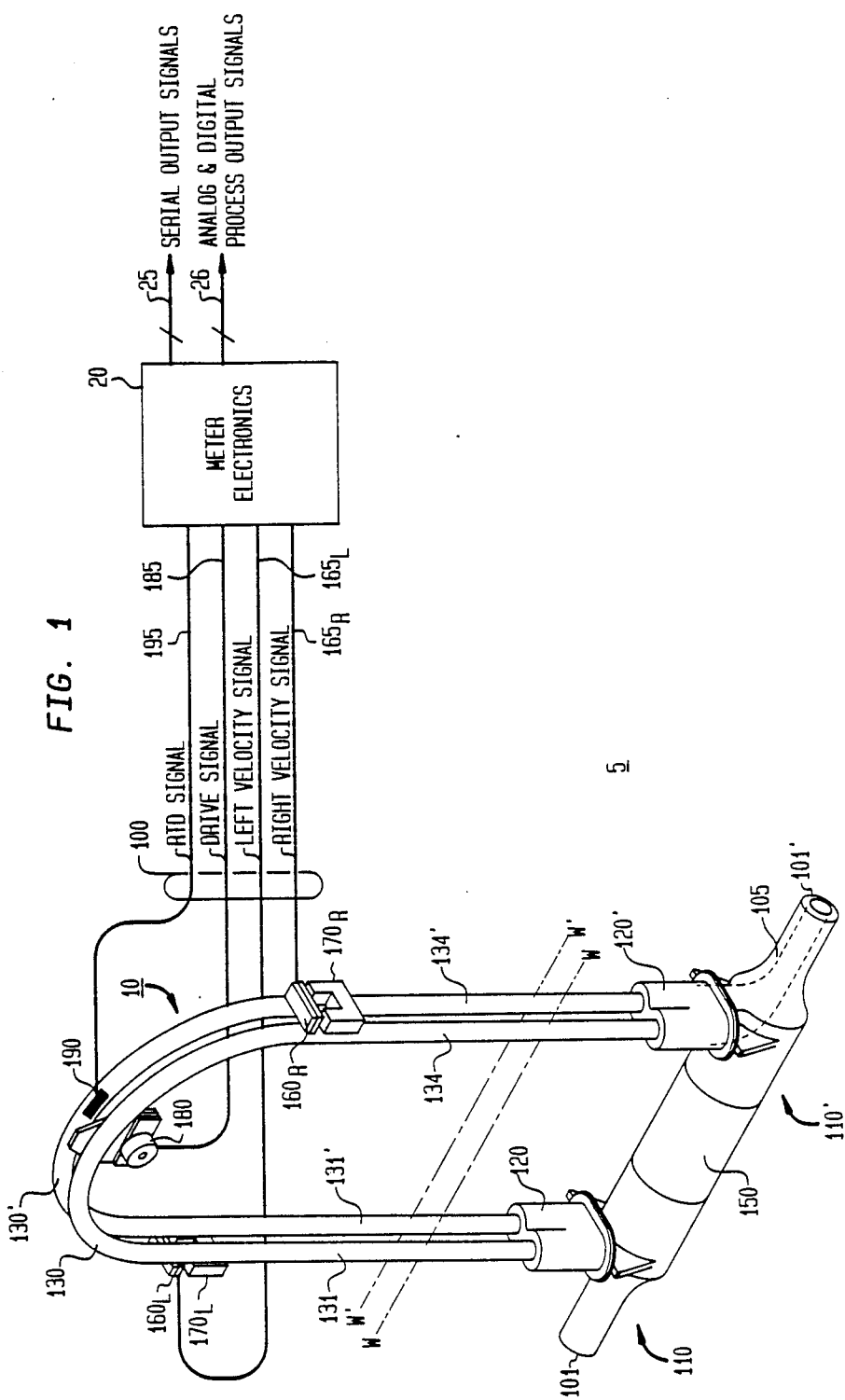
FIG. 1 is an overall diagram of Coriolis mass flow rate metering system 5 that incorporates the teachings of the present invention.

FIG. 1 shows an overall diagram of Coriolis mass flow rate metering system 5 that embodies the teachings of the present invention.

As shown, system 5 consists of two basic components: Coriolis meter assembly 10 and meter electronics 20. Meter assembly 10 measures the mass flow rate of a desired process fluid. Meter electronics 20, connected to meter assembly 10 via leads 100, provides mass flow rate and totalized mass flow information. Mass flow rate information and internally totalized mass flow values are provided by meter electronics in serial form over leads 25. Mass flow rate information is also provided over leads 26 in frequency form and in scaled pulse form. In addition, mass flow rate information is also provided in analog 4–20 mA form over leads 26 for easy connection to downstream process control and/or measurement equipment.

User input (e.g., selection of measurement units and parameter entry) is provided through a specialized serial interface connected to the 4–20 mA signal. Specifically, the 4–20 mA signal that runs between the meter and a remote user location (not shown) carries a superimposed high frequency carrier that is modulated by serial data signals. Through this interface, a user merely taps into 4–20 mA signal at a convenient location using a device, effectively a hand held terminal with a suitable electrical interface, such as a model 268 "Smart Family" Interface currently manufactured by Rosemount Inc. of Eden Prairie, Minn. and begins serial communication with meter electronics 20. Through this communication, the user is able to set various software switches and enter a variety of user parameters for subsequent use by the meter electronics.

Coriolis meter assembly 10, as shown, includes a pair of manifolds 110 and 110'; tubular member 150; a pair of parallel flow tubes 130 and 130'; drive mechanism 180; a pair of velocity sensing coils $160_L$ and $160_R$; and a pair of permanent magnets $170_L$ and $170_R$. Tubes 130 and 130' are substantially U-shaped and have their ends attached to tube mounting blocks 120 and 120', which are in turn secured to respective manifolds 110 and 110'. Both flow tubes are free of pressure sensitive joints.

With the side legs of tubes 130 and 130' fixedly attached to tube mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the fluid that is being measured, fluid enters the meter through an orifice in inlet end 101 of manifold 110 and is conducted through a passageway therein having a gradually changing cross-section to tube mounting block 120. There, the fluid is divided and routed through flow tubes 130 and 130'. Upon exiting flow tubes 130 and 130', the fluid is recombined in a single stream within tube mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101', the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow tubes 130 and 130'.

U-shaped flow tubes 130 and 130' are selected and mounted so as to have substantially the same moments of inertia and spring constants about bending axes W—W and W'—W', respectively. These bending axes are perpendicularly oriented to the side legs of the U-shaped flow tubes and are located near respective tube mounting blocks 120 and 120'. The U-shaped flow tubes extend outwardly from the mounting blocks in an essentially parallel fashion and have substantially equal moments of inertia and equal spring constants about their respective bending axes. Inasmuch as the spring constant of the tubes changes with temperature, resistive temperature detector (RTD) 190 (typically a platinum RTD device) is mounted to one of the flow tubes, here tube 130', to continuously measure the temperature of the tube. The temperature of the tube and hence the voltage appearing across the RTD, for a given current passing therethrough, will be governed by the temperature of the fluid passing through the flow tube. The temperature dependent voltage appearing across the RTD is used, as discussed in detail later, by meter electronics 20 to appropriately compensate the value of the spring constant for any changes in tube temperature.

The RTD is connected to meter electronics 20 by lead 195.

Both of these flow tubes are sinusoidally driven in opposite directions about their respective bending axes and at essentially their common resonant frequency. In this manner, both flow tubes will vibrate in the same manner as do the tines of a tuning fork. Drive mechanism 180 supplies the sinusoidal oscillatory driving forces to tubes 130 and 130'. This drive mechanism can consist of any one of many well known arrangements, such as a magnet and a coil through which an alternating current is passed, for sinusoidally vibrating both flow tubes at a common frequency. A suitable oscillatory drive signal, as discussed in detail below in conjunction with FIG. 4, is applied by meter electronics 20, via lead 185, to drive mechanism 180.

With fluid flowing through both tubes while these tubes are sinusoidally driven in opposite directions, Coriolis forces will be generated along adjacent side legs of each of flow tubes 130 and 130', but in opposite directions, i.e. the Coriolis force generated in side leg 131 will oppose that generated in side leg 131'. This phenomenon occurs because although the fluid flows through the flow tubes in essentially the same parallel direction, the angular velocity vectors for the oscillating flow tubes are situated in opposite though essentially parallel directions. Accordingly, during one-half of the oscillation cycle of both flow tubes, side legs 131 and 131' will be twisted closer together than the minimum distance occurring between these legs produced by just the oscillatory movement of the tubes generated by drive mechanism 180. During the next half-cycle, the generated Coriolis forces will twist the side legs 131 and 131' further apart than the maximum distance occurring between these legs produced by just the oscillatory movement of the tubes generated by drive mechanism 180.

During oscillation of the flow tubes, the adjacent side legs, which are forced closer together than their counterpart side legs, will reach the end point of their travel, where their velocity crosses zero, before their counterparts do. The time interval which elapses from the instant one pair of adjacent side legs reaches their end point of travel to the instant the counterpart pair of side legs, i.e. those forced further apart, reach their respective end point is proportional to the total mass flow rate of the fluid flowing through meter assembly 10. This time interval ($\Delta t$) is readily measured through a four pulse measurement technique, as discussed in detail below, by measuring the time interval that occurs between each of two measurement points situated on one, e.g. the right, velocity (or position) waveform with respect to a reference point situated on the other, e.g. left, velocity (or position) waveform and which temporally occurs between each of the two measurement points. For a detailed explanation of this technique, the reader is also referred to co-pending United States patent application entitled "CORIOLIS MASS FLOW RATE METER HAVING FOUR PULSE HARMONIC REJECTION" that has been filed simultaneously herewith, assigned Ser. No. 217,012 and has been assigned to the same assignee herein. In addition, the reader is also referred to U.S. Pat. No. 4,491,025 (issued to J. E. Smith et. al. on Jan. 1, 1985) for a more detailed discussion of the principles of operation of parallel path Coriolis flow meters than that just presented.

To measure the time interval, $\Delta t$, coils $160_L$ and $160_R$ are attached to either one of tubes 130 and 130' near their free ends and permanent magnets $170_L$ and $170_R$ are also attached near the free ends of the other one of the tubes. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of the tube and can be processed, as set forth in detail later, to determine the time interval and, in turn, the mass flow rate of the fluid passing through the meter. In particular, coils $160_L$ and $160_R$ produce the left and right velocity signals that appear on leads $165_L$ and $165_R$, respectively.

As noted, meter electronics 20 accepts as input the RTD signal appearing on lead 195, and left and right velocity signals appearing on leads $165_L$ and $165_R$, respectively. Meter electronics 20 also produces, as noted, the sinusoidal drive signal appearing on lead 185. Leads $165_L$, $165_R$, 185 and 195 are collectively referred to as leads 100. The meter electronics, as explained below, processes both the left and right velocity signal and the RTD temperature to determine the mass flow rate and totalized mass flow of the fluid passing through meter assembly 10. This mass flow rate is provided by meter electronics 20 on associated lines within leads 26 in analog 4–20 mA form and in serial form over leads 25. Mass flow rate information is provided in frequency form (typically with a maximum range of 0–10 kHz), over an appropriate line within leads 26 for connection to downstream equipment. Totalized flow information is also provided in serial form over leads 25. Fault conditions are indicated by flashing a light emitting diode (LED), discussed in detail in conjunction with FIGS. 2A and 2B, four times a second.

Figure 2B:
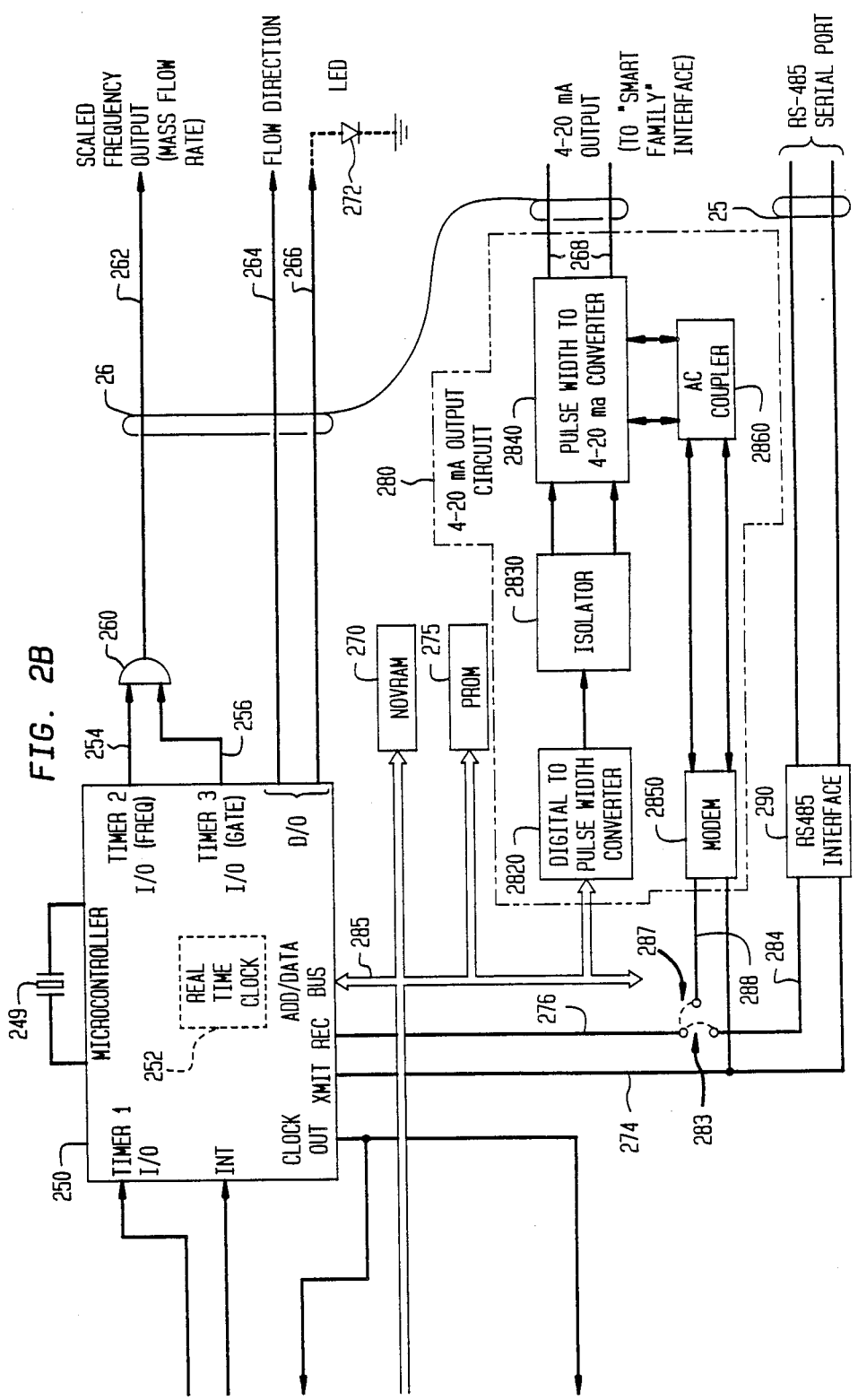

A block diagram of meter electronics 20 is depicted in FIGS. 2A and 2B, for which the correct alignment of the drawing sheets for these figures is shown in FIG. 2. A 16-bit microcontroller, preferably model HPC36003 microcontroller from National Semiconductor of Santa Clara, Calif., forms the basis of meter electronics 20. Bi-directional address and data busses 285 link the microcontroller to four pulse measurement circuit 230, non-volatile random access memory (NOVRAM) 270, programmable read only memory (PROM) 275 and 4–20 mA output circuit 280. Appropriate clock signals are generated by microcontroller 250 using crystal 249 which typically has a resonant frequency of 16 MHz. In addition, the microcontroller contains real time clock 252 to generate a stream of timing pulses. Each of these pulses, which occurs at intervals of 1/64 second, as described in detail below, causes a real time clock interrupt routine to execute and update a timing value used to generate the scaled frequency output signal appearing on lead 262.

As noted, RTD 190 measures the temperature of flow conduit 130' (see FIG. 1). The value of the temperature is used by microcontroller 250 in compensating the value of the spring constant of the flow conduit for any temperature changes. Inasmuch as circuit 20 does not contain any analog-to-digital (A/D) converters but uses timers, the voltage appearing across RTD 190 is routed, via lead 195, to voltage-to-frequency (V/F) converter 245 which converts this voltage into an appropriate frequency within a pre-determined range. The resulting signal is applied via lead 247 to an input of a timer, specifically TIMER 1, on microcontroller 250. This timer counts the pulses appearing in this signal during a given period of time to produce a digital value proportional to the measured temperature. This value is periodically read by the program executing within the microcontroller.

Four pulse measurement circuit 230, as discussed in detail below, processes the velocity waveforms produced by right and left velocity sensors $160_R$ and $160_L$, respectively, to determine a digital up count and a digital down count which, when subtracted, provide a value of $\Delta t$. The value of both of these counts are read, via busses 285, through servicing of a tube period interrupt once during every two cycles of oscillatory movement of the flow conduits by the microcontroller. In servicing this interrupt, the microcontroller subtracts these values to yield a current measure of $\Delta t$ which is then used in determining the current value of mass flow rate.

Drive circuit 240 provides a sine wave drive signal, via lead 185, to drive coil 180. This circuit synchronizes the sine wave drive signal to the left velocity signal, specifically the amplified left velocity signal produced by amplifier 204 situated within four pulse measurement circuit 230.

NOVRAM 270 contains non-volatile random access memory for temporary data storage. This memory is illustratively implemented using integrated circuits containing battery backed up CMOS RAM circuits. New values of both constants and data are routinely written into the NOVRAM during program execution. PROM 275 contains program storage.

Output circuit 280 provides a specialized serial interface, as noted above, that modulates a carrier signal superimposed onto a 4–20 mA output signal. This output circuit contains digital to pulse width converter 2820, isolator 2830, pulse width to 4–20 mA converter 2840, modem 2850 and AC coupler 2860. The 4–20 mA signal itself provides a linear current value that is proportional to either the measured flow rate or density, as selected by the user, of the process fluid flowing through meter 10. To generate the 4–20 mA signal itself, microcontroller 250 loads an appropriate digital value, via busses 285, into digital to pulse width converter 2820. This converter produces a stream of pulses having a pulse width defined by the digital value. These pulses are transmitted through isolator 2830, typically optical, to pulse width to 4–20 mA converter 2840. In this manner, meter electronics 20 remain isolated from any hazardous voltages existing in downstream process control equipment. Converter 2840 produces a current signal for transmission over leads 268, that form part of leads 26, having a value between 4 and 20 mA inclusive that is proportional to the measured flow rate or density, as selected by the user during meter configuration. This current signal can be converted into a corresponding voltage signal by connecting an appropriately valued resistor, e.g. 250 ohms to yield 1–5 volts, across leads 268. Microcontroller 250 contains internal interfaces to accept bi-directional serial data. Outgoing serial data generated by the microcontroller appears at its transmit ("XMIT") output pin and is applied to lead 274 and from there to appropriate inputs of conventional RS-485 serial interface 290 and also to modem 2850 located within 4–20 mA output circuit 280. The modem converts the data into the HART protocol (HART is a trademark of Rosemount Inc.) which uses a frequency shift keyed (FSK) serial signal that is based upon type 202 Bell signalling. This signal is then routed to coupler 2860 which AC couples the FSK signal onto the 4–20 mA output signal.

The meter can be configured by placing a jumper in either position 283 or 287, as shown by dotted lines, to respectively receive serial data via RS-485 interface 290 or over the 4–20 mA signal. To receive incoming serial data appearing over the 4–20 mA signal, the jumper is placed in position 287 so that incoming serial data from modem 2850 is applied to microcontroller 250. Specifically, in this case, AC coupler 2860 routes an incoming FSK signal to modem 2850 which extracts the serial data therefrom. This data is then applied, via leads 288 and 276, to the receive ("REC") input pin of microcontroller 250. At a remote user location, a user merely taps into 4–20 mA signal at a convenient location using a device, effectively a hand held terminal with a suitable electrical interface, such as the model 268 "Smart Family" Interface currently manufactured by Rosemount Inc. of Eden Prairie, Minn. and can serially communicate on a bi-directional basis with meter electronics 20. Through this communication, the user is able to set various software switches and enter a variety of user parameters for subsequent use by the meter electronics and obtain information on any detected fault conditions that have occurred within the meter electronics. Incoming RS-485 serial signals appearing on leads 25 are routed to RS-485 interface 290 which, in turn, extracts serial data therefrom and applies this data to leads 284. Now, if a user sets the jumper into position 283, then incoming serial signals from RS-485 interface 290 can be directed, via leads 284 and 276, to the receive input pin of microcontroller 250.

As noted above, $\Delta t$ measurements are made by measuring the time interval that occurs between each of two measurement points located on a rising side of one, e.g. the right, velocity (or position) waveform with respect to a reference point situated on the other, e.g. left, velocity (or position) waveform and which temporally occurs between each of the two measurement points. For conditions of no flow when no phase difference appears between the right and left velocity waveforms, the measurement points must be symmetrically situated on either side of the reference point. The difference in the duration of the time intervals between the first measurement point and the reference point and the reference point and the second measurement point is proportional to the phase difference between the left and right velocity waveforms and hence to the measured mass flow rate. Therefore, one counter (the "up" counter), specifically (divide-by-four) pre-scaling counter 226 and 16-bit counter C1 located within counters 234, measures the time interval (the "up" interval) between the first one of the measurement points and the reference point. Another counter (the "down" counter), specifically (divide-by-four) pre-scaling counter 228 and 16-bit counter C2 also situated within counters 234, measures the time interval (the "down" interval) occurring between the reference point and the second one of the two measurement points. To provide sufficient accuracy, these counters are incremented at the clock frequency produced by crystal 249, typically 16 MHz. Similar time interval measurements are made using a set of two measurement points situated on a falling side of the right velocity waveform and a reference point temporally located therebetween on the left velocity waveform. Again, at zero flow the measurement points on the falling side must be symmetrically situated about their corresponding reference point. The counters are not reset between the rising and falling sides of each velocity waveform but rather are allowed to continue accumulating during measuring intervals occurring over a total of two adjacent cycles of these waveforms. Once these cycles have occurred, then a Δt measurement is calculated by the microcontroller by simply subtracting the total count stored within the "DOWN" counter from that existing within the "UP" counter. Advantageously, empirical observations show that measuring Δt in this way provides substantial reductions in the amounts of even harmonics present in the measured Δt values over those produced through conventional analog techniques known in the art, such as for example that shown in U.S. Pat. No. 4,422,338 (issued to J. E. Smith on Dec. 23, 1983). Consequently, the mass flow rate values, and hence the totalized flow values, produced by microcontroller 250 contain substantially less error than heretofore possible using techniques currently known in the art. For a detailed explanation of this four pulse measurement technique, the reader is also referred to co-pending United States patent application entitled "CORIOLIS MASS FLOW RATE METER HAVING FOUR PULSE HARMONIC REJECTION" that has been filed simultaneously herewith, assigned Ser. No. 217,012 and has been assigned to the same assignee herein.

Figure 3:
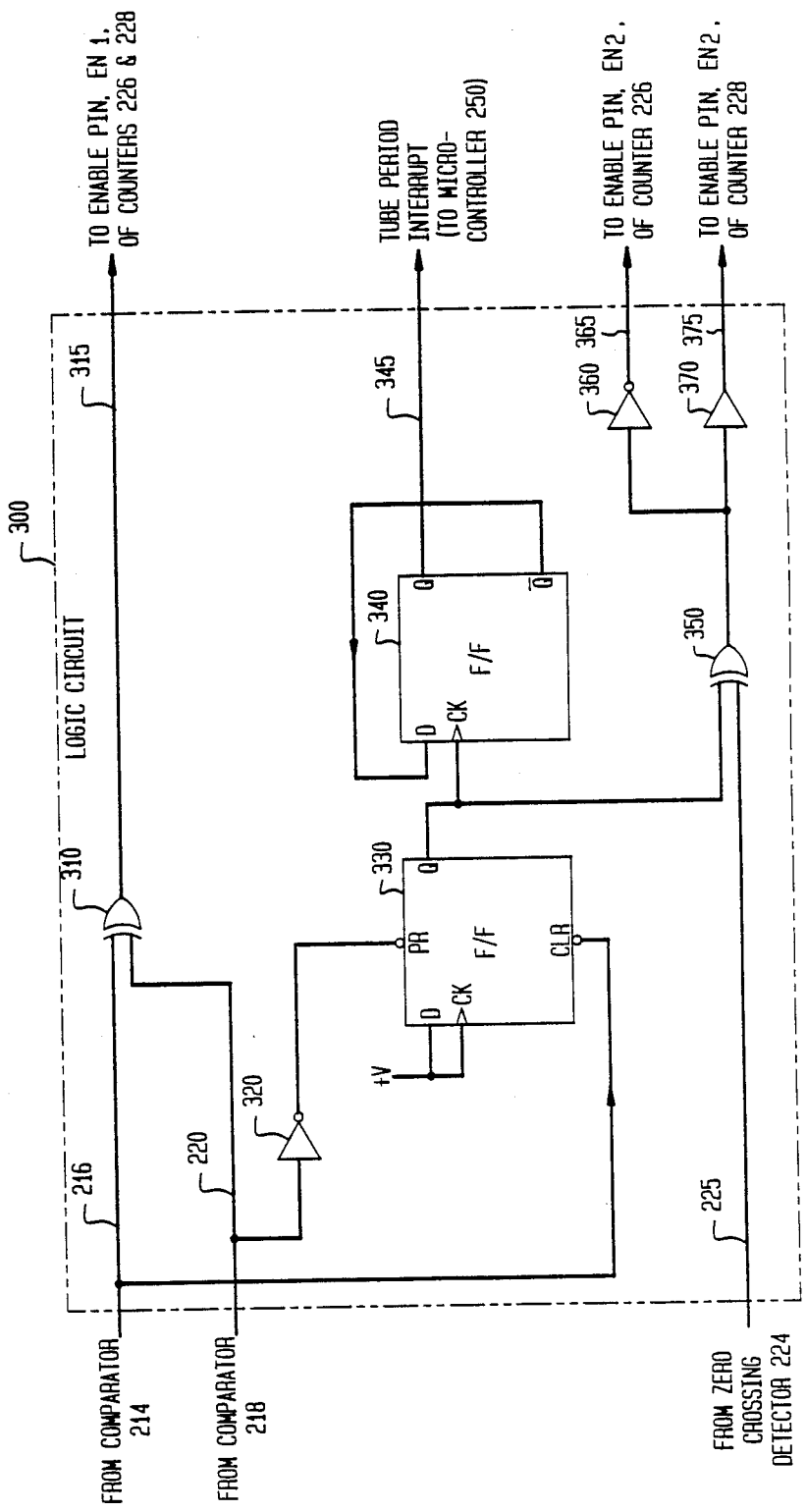
FIG. 3 is a block diagram of logic circuit 300 shown in FIGS. 2A and 2B.

Now, with this description of the four pulse measurement technique in mind, the discussion will now turn to a description of four pulse measurement circuit 230. Velocity waveforms produced by right and left velocity sensors 160$_R$ and 160$_L$ are routed by leads 165$_R$ and 165$_L$, respectively, to amplifiers 202 and 204 which impart appropriate gain, typically a factor of ten, to these signals. The resulting amplified right and left sensor signals are routed to precision integrators 208 and 210 which impart a ninety degree shift to each of these signals, in effect converting each velocity signal into a position signal. Each integrator also provides some filtering to remove noise and other high frequency artifacts from each velocity signal. The integrated waveforms are then applied to saturating amplifiers 209 and 222 which amplify these signals and clip the positive and negative levels of the resulting signals to ±10 volts to prevent comparators 214, 220 and 224 situated downstream of these integrators from being driven into saturation. The reference point on both the rising and falling sides on the left velocity sensor waveform is conveniently chosen to be the zero crossing point of the corresponding position waveform. Any other point on the left velocity (or position) waveform can be chosen as the reference point as long as the associated measurement points are symmetrically situated about this reference point at a zero flow condition. As such, comparator 224 changes its output state on lead 225 at the occurrence of each reference point (zero crossing). The measurement points are taken to be symmetric voltages, ±V$_r$, illustratively ±4 volts, about zero. Comparators 214 and 218 are used to detect the occurrence of each measurement point on the right velocity (here position) waveform by applying a high level to corresponding leads 216 or 220. The signals appearing on leads 216, 220 and 225 are routed to logic circuit 300 which through simple combinatorial gating, as shown in FIG. 3 and discussed in detail below, generates a pulse on lead 345 every two tube cycles that serves as the tube period interrupt and, as shown in FIGS. 2A and 2B, appropriate enable signals to counters 226 and 228 that form part of the up and down counters. In particular, counters 226 and 228 are clocked by 16 MHz clock pulses appearing on clock leads 236. Each of these counters contain two enable inputs, En1 and En2, that must both be high in order for the counters to increment. In response to the comparator outputs, logic circuit 300 generates a high level pulse on lead 315 to the EN1 inputs of both counters whenever the first measurement pulse has occurred. This high level continues throughout the entire timing interval, i.e. to the occurrence of the second measurement pulse. Thereafter, depending upon which specific counter is to be incremented during a timing interval (i.e. between the first measurement point and the reference point or between the reference point and the second measurement point), logic circuit 300 will provide a high level on either lead 365 or 375 to the En2 input of counter 226 or 228, respectively, to cause only that counter to increment during that interval. Since counters 234 typically can not be clocked at the same high rate as counters 226 and 228, these latter two counters serve as divide-by-four pre-scalers. As such, the overflow output of counters 226 and 228 are routed to the clock inputs, Ck1 and Ck2, of separate 16-bit counters C1 and C2 situated within counters 234. Counters C1 and C2 are connected to bus 285. As such, at the occurrence of every interrupt on lead 345, microcontroller 250 reads the contents of both of these counters. As noted below, these counters are not cleared but instead are allowed to roll over with the values of these counters occurring at the conclusion of the immediately prior set of two adjacent tube cycles being subtracted by the microcontroller from the values that occurred at the conclusion of the present set to yield the appropriate counts.

Meter electronics 20 also provides three digital process output signals on leads 26: scaled frequency output pulses on lead 262, a level on lead 264 to indicate flow direction and a low frequency signal on lead 266 to pulse remotely mounted light emitting diode (LED) 272 at a rate of 1 Hz to indicate normal operation or at a rate of 4 Hz to indicate the detection of a fault condition. Separate single bit digital outputs available on microcontroller 250 are used to provide the appropriate signals on leads 264 and 266.

Figure 7:
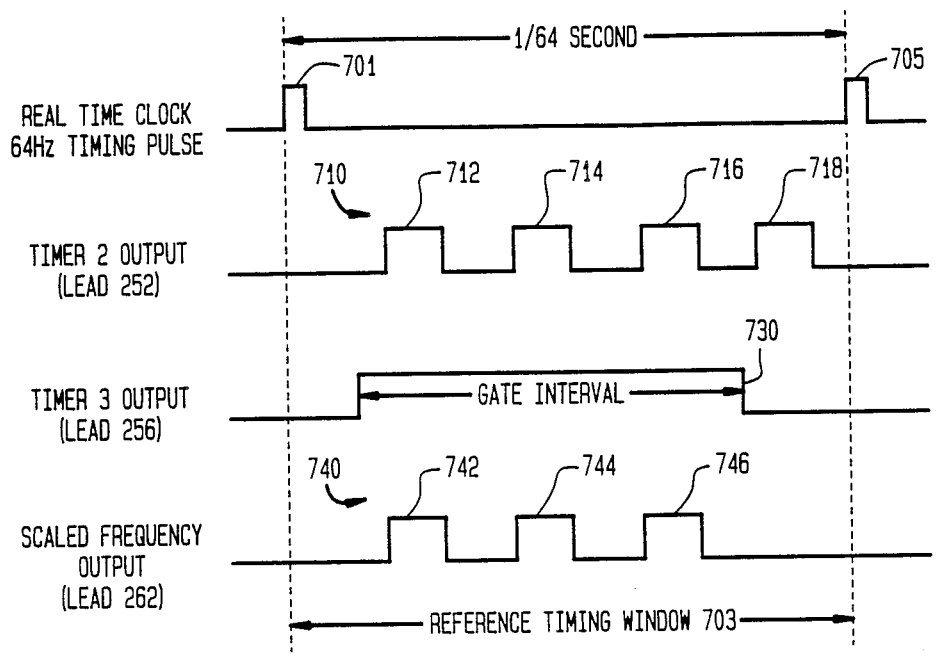
FIG. 7 is a diagram showing illustrative waveforms used in producing the Scaled Frequency Output Signal according to the teachings of the present invention and appearing on lead 262 shown in FIGS. 2A and 2B.

Specifically, the scaled frequency output is generated through a gated combination of two timer output signals. Each pulse appearing on the scaled frequency output, i.e. lead 262, represents that a user selected amount of fluid, e.g. one ounce or one gram, has flowed through the meter in a user defined interval of time, such as one second. Now, to facilitate understanding, the reader should simultaneously refer to both FIGS. 2A, 2B and 7 for the following discussion. FIG. 7 shows illustrative waveforms used in producing the scaled frequency output signal. These timers, TIMER2 and TIMER3, are internal to the microcontroller. The occurrence of every 64 Hz interrupt defines the beginning of every 1/64 second timing interval by a pulse, such as pulse 701 or 705, generated by real time clock 252 located within microcontroller 250. The timing interval is used to define, as discussed below, reference timing window 703 which is typically 1/64 second (as shown) but for low flow rates can be also be 1/32 second or even 1/16 second. During servicing of the 64 Hz interrupt, as discussed in detail below, the internally totalized mass flow is updated. The internally totalized mass flow value is maintained to a 32 bit resolution with the upper 8 bits constituting one portion and the remaining 24 bits constituting a second portion (a "remainder"). Essentially, once the update operation has been performed, the value of the upper 8 bit portion is used as an address to a look up table which provides current "frequency" and "gate" values to load into timers TIMER2 and TIMER3, respectively. The "frequency" value loaded into timer TIMER2 when counted down by the timer operating at the microcontroller clock frequency (16 MHz) during the next immediately occurring timing reference window, generally 1/64 second, provides the "ON" time for each output pulse to be produced by that timer during that interval. The "ON" time is set to provide a sequence containing the desired number of square pulses, i.e. each pulse having a 50% duty cycle, during the timing cycle, such as pulses 712, 714 and 716. Once the timer is loaded with a value, it is merely instructed to run and produce pulses on lead 254 until the timer is updated again during the next timing reference window. Unfortunately, due to the occurrence of nested interrupt servicing which may occur from time to time, timer TIMER2 may not necessarily be updated at the appropriate point during the start of the next successive timing reference window but rather somewhat later. Timer TIMER2 will still be producing pulses during this time. Consequently, to advantageously prevent any additional, i.e. extraneous, pulses, such as pulse 718, produced by this timer from corrupting the scaled frequency output signal and causing the value of the externally totalized mass flow from diverging from the internally totalized mass flow rate value, the "gate" value is loaded into timer TIMER3 essentially simultaneously with the "frequency" value being loaded into timer TIMER2. Once this occurs, both timers are instructed to begin counting and produce respective output signals that both start, at the beginning of a reference timing window, from one logic state (either high or low) and end, at the conclusion of the window, in one logic state (either high or low). An erroneous output occurs if the outputs of both timers are in opposite or different logic states at the end of any such window. Logic circuitry (not shown) could be fabricated to test for this error condition and appropriately inform microcontroller 250 of its occurrence. Use of this circuitry might be useful in very high accuracy metering applications such as in custody transfers. In any event, as shown, the "gate" value defines an interval of time, an "ON" time, which will last from the beginning of the first frequency output pulse to be generated in the timing reference window and run approximately half way through the low level portion of the last frequency output pulse to be produced during that window. As such, the output, e.g pulse 730, produced by timer TIMER3 and appearing on lead 256 is at a high level during this time. The signals appearing on leads 254 and 256 are then applied to corresponding inputs of AND gate 260 which gates only the correct number of square pulses, e.g. pulses 742, 744 and 746, through as the scaled frequency output signal appearing on lead 262. Accordingly, the scaled frequency output signal can be viewed as an "absolute" frequency output signal. Consequently, inasmuch as the remainder of the accumulated mass flow is always maintained, particularly to a 24 bit resolution, and only the proper ("absolute") number of square output frequency pulses are produced during any timing reference window, the internally and externally totalized counts will not substantially diverge over time.

A block diagram of logic circuit 300 shown in FIGS. 2A and 2B is depicted in FIG. 3. The outputs of comparators 214 and 218 define the beginning and end of a $\Delta t$ measuring interval, i.e. the occurrence of first and second measurement points ($\pm V_r$ values) on the right velocity sensor waveform that sandwich a corresponding reference point (zero crossings) on the left velocity sensor waveform. As depicted, these outputs are routed over leads 216 and 220 to corresponding inputs of exclusive OR gate 310 which, in turn, provides a high level within each measuring interval, on lead 315 that is routed to the first enable, En1, input of counters 226 and 228 in measurement circuit 230. In addition, the output of comparator 218 present on lead 220 is used to preset, via inverter 320, flip flop 330 while the output of comparator 214 present on lead 216 clears this flip flop. The true, Q, output of flip flop 330 is fed to the clock input of flip flop 340 which merely acts to divide this output by two. The resulting divided output, which has a pulse rate of once every two tube cycles, is applied over lead 345 to microcontroller 250 as the tube period interrupt. To generate the second enable signals, En2, to counters 226 and 228, the output of comparator 224 is routed via lead 225 to one input of exclusive OR gate 350. The other input to this gate is the signal at the true output of flip flop 330. As such, this gate produces a high level during the first portion of each measuring interval, i.e. after the occurrence of every first measuring point and before its associated zero crossing point, and a low level during the second portion of each measuring interval, i.e. after the occurrence of each reference point (zero crossing) and before the occurrence of its associated second measuring point. The output of gate 350 is applied through inverter 360 to lead 365 as the En2 enable signal to counter 226 and through buffer 370 to lead 375 as the En2 enable signal to counter 228.

B. Software

The software executed by microcontroller 250 essentially consists of Main Loop 400 and two interrupt service routines: 64 Hz Interrupt Routine 500 and Tube Period Interrupt Routine 600. Main Loop 400 performs initialization and then waits for either an interrupt to occur or a user to signal the meter to enter a configuration mode in order to change a user selectable value. 64 Hz Interrupt Routine 500 is executed every time a 64 Hz timing pulse occurs to read the up and down counters and update the measured mass flow rate value. Tube Period Interrupt Routine 600 is executed once every two cycles of flow conduit (tube) movement to update the scaled frequency output.

Main Loop 400 is collectively shown in FIGS. 4A and 4B, for which the correct alignment of the drawing sheets for these figures is depicted in FIG. 4.

Specifically, upon entry into Main Loop 400, which generally occurs during a power-on reset condition, execution first proceeds to initialization routine 410. Within this routine, block 413 first executes to disable all interrupts. Thereafter, block 415 is executed to perform various hardware initialization steps and various software based diagnostics. Once this occurs, block 418 is executed to set various software variables to their initial values. These variables include: SLONG1, SLONG2, OLD.DELTA.T and NEXT.DELTA.T that are used within routine 600, as discussed below. Thereafter, block 420 is executed to load default values for various parameters from NOVRAM in the event software initialization has not previously occurred, such as during system start-up after an occurrence of a power on reset. If software initialization has occurred, then previously entered user selected values for these parameters will be used in lieu of the corresponding default values. Execution then proceeds to block 425 which calculates and stores the expected maximum output frequency (MAX_FREQ) that should occur at the maximum flow rate. Thereafter, execution proceeds to block 430 which initializes a counter, DIVIDE_DOWN, to zero. This counter is used in counting timing intervals in the event flow rates are to be measured. Decision blocks 435 and 445 are then executed to determine whether low flow rates are to be measured and, if so, to set a counter to define the appropriate update interval. Specifically, if the value of MAX.FREQ is less than "16", then decision block 435 routes execution, via its YES path, to block 440 which, when executed, sets the value of counter DIVIDE_DOWN to one, thereby providing an update interval of 1/32 second for the scaled frequency output. Execution then proceeds to decision block 445. Alternatively, if the value of MAX_FREQ is greater than or equal to "16", then execution proceeds, via NO path 438, to decision block 445. This decision block, when executed, determines whether the value of MAX_FREQ is less than "8". If it is, then execution proceeds, via the YES path emanating from decision block 445, to block 450 which, when executed, sets the value of counter "DIVIDE_DOWN" to two, thereby providing an update interval equal to 1/16 second for the scaled frequency output. Execution then proceeds to block 455. Alternatively, if the value of MAX_FREQ is greater than or equal to "8", then execution proceeds, via NO path 448, to decision block 455. Block 455, when executed, calculates and stores the value of variable FREQ1 which, as discussed below, subsequently serves as a scale factor that will be multiplied by the flow rate to determine the appropriate number of scaled frequency output pulses to provide during an update interval. Once block 455 executes, execution of initialization routine 410 has concluded.

At this point, main loop 400 waits either for interrupts or for user entry into a configuration mode to occur. Specifically, execution proceeds to block 457 to enable all interrupts. Thereafter, execution proceeds to decision block 460. In the event an interrupt occurs, then execution proceeds to block 465, via the YES path emanating from this decision block. Block 465, when executed, executes the appropriate interrupt service routine (64 Hz Interrupt Service Routine 500 or Tube Period Interrupt Routine 600) to service the interrupt. Once this has occurred or in the event no interrupt has just occurred in which case decision block 460 routes execution to NO path 463, then execution proceeds to decision block 470. This decision block determines whether the user has requested to change the configuration of the meter. If the user has made this request, such as through depressing an appropriate key on the external terminal, then decision block 470 routes execution, via its YES path, to block 475. This block, when executed, prompts the user through a pre-defined menu, accessible through the serial port and external terminal equipment (such as the model 268 "Smart Family" Interface discussed above), to enter user selectable values of various parameters. These parameters include a maximum flow rate (MAX_FLOW_RATE) that will be measured, a user selected maximum frequency, e.g. 10 kHz, (USER_FREQ) that is to be generated on the scaled frequency output and a user selected flow rate (USER_RATE) that corresponds to this frequency. Thereafter, execution loops back, via path 480, to the entry point of initialization routine 410. Alternatively, if the user has not made such a request, then decision block 470 routes execution, via NO path 473, back to decision block 460 to wait for an interrupt to occur. Although the loop containing decision block 460 and execution block 465 is generally not explicitly programmed but is rather hard wired within the microcontroller itself, this loop is used to facilitate understanding by diagrammatically depicting the interrupt servicing process.

Figure 5B:
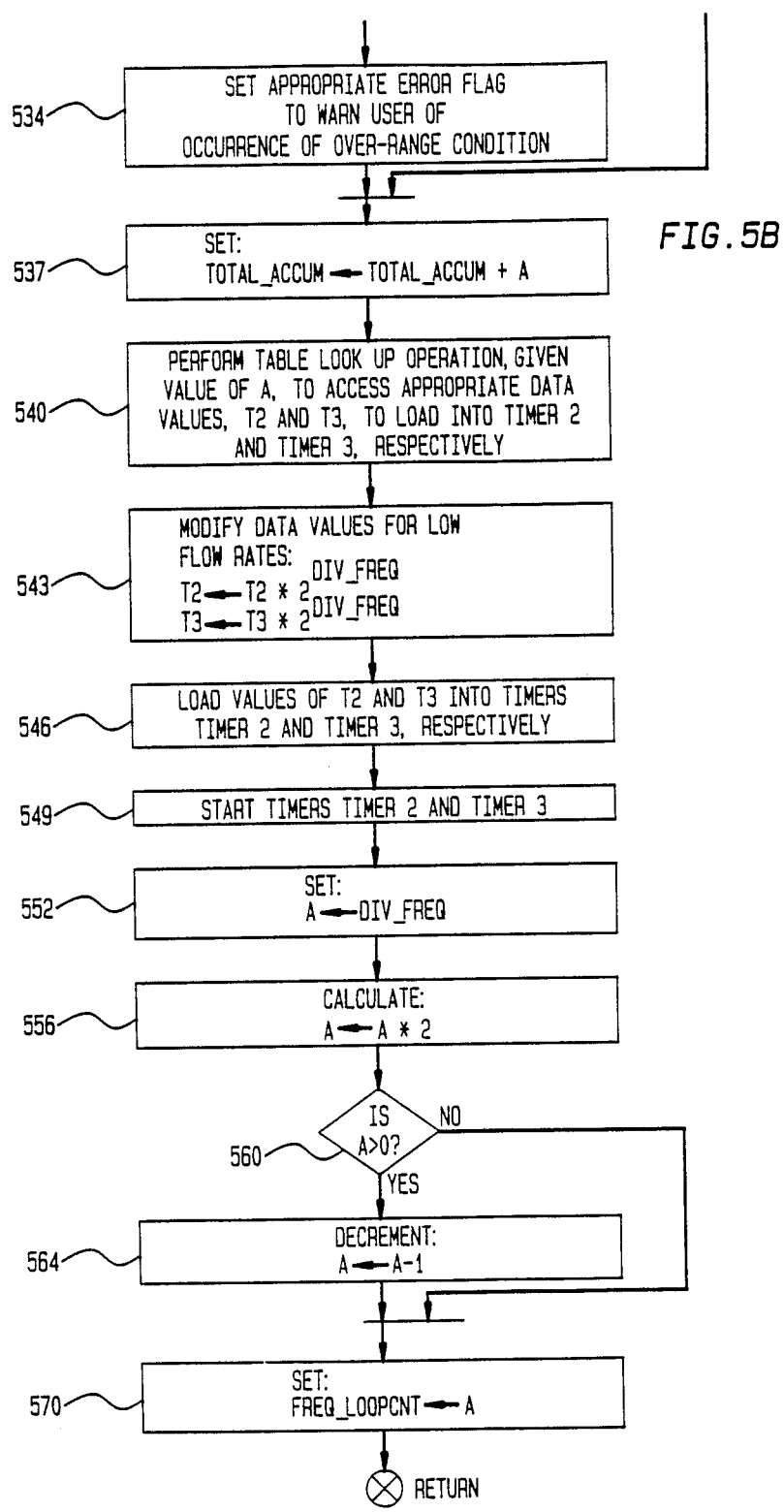

A flowchart of 64 Hz Interrupt Routine 500, that is executed as part of Main Loop 400, is collectively shown in FIGS. 5A and 5B, for which the correct alignment of the drawing sheets for these figures is shown in FIG. 5. As noted, 64 Hz Interrupt Routine 500 is executed every time a 64 Hz timing pulse occurs to read the up and down counters and update the measured mass flow rate value.

Specifically, upon entry into routine 500, execution proceeds to block 503 which reads the value of internally totalized mass flow (PULSE_ACCUM) from NOVRAM 270 (see FIGS. 2A and 2B). Thereafter, as shown in FIGS. 5A and 5B, execution proceeds to block 506 which updates the totalized mass flow, maintained in terms of scaled frequency output pulses, given the latest measured mass flow rate value (RATE) occurring during the immediately prior timing interval. This mass flow rate value is multiplied by the value of scale factor FREQ1, that has been determined during initialization, to determine the number of pulses that need to be added. The resulting updated value is then stored back in NOVRAM 270. Once this occurs, execution proceeds to block 509 to store the value of counter DIVIDE_DOWN into temporary variable DIV_FREQ. Thereafter, execution proceeds to decision block 512 to determine, for low maximum flow rates where 1/32 and 1/16 second timing intervals are used, whether updating of the frequency output should occur in the present 1/64 second timing interval. In the event the contents of loop counter FREQ_LOOPCNT is not zero thereby indicating that no such updating will occur during the current interval, then decision block 512 routes execution, via its NO path, to block 515 which merely decrements the value of counter FREQ_LOOPCNT by one. Thereafter, execution returns from routine 500. Alternatively, if the contents of FREQ_LOOPCNT equal zero thereby indicating that updating should occur, then decision block 512 routes execution, via its YES path, to block 518. This block, when executed, stops timers TIMER2 and TIMER3 which provide the frequency and gate outputs from microcontroller 250 (see FIGS. 2A and 2B). Once this occurs, as shown in FIGS. 5A and 5B, execution proceeds to block 522 which, when executed, reads the upper byte of the variable PULSE_ACCUM and stores the result in temporary variable A. Next, execution proceeds to decision block 525 to determine whether the value of variable A exceeds "180" which is a pre-defined maximum number of square pulses that can be produced in a reference timing window. Specifically, most frequency outputs in commercial equipment have a maximum output frequency of approximately 10 kHz. Hence, the maximum value of variable A is sized to provide a compatible maximum frequency for the scaled frequency output. Accordingly, with the value of variable A at "180", the maximum number of output pulses/second using a 1/64 second reference timing window is 180 * 64 or 11,520 pulses. With a reference timing window having a duration of either 1/32 or 1/16 second, the maximum number of output pulses/second is 180 * 32 or 5,760 pulses, or 180 * 16 or 2,880 pulses, respectively. Now, in the event the value of variable A exceeds "180", then decision block 525 routes execution, via its YES path, to block 531 which, when executed, sets the value of variable A to "180". Execution then proceeds to block 534 which sets an appropriate error flag to warn the user of the occurrence of an over-range condition. Execution then proceeds to block 537. Alternatively, if the value of variable A equals or is less than "180", then decision block 525 routes execution, via its NO path, directly to block 537. Block 537, when executed, updates the value of a totalizer, TOTAL_ACCUM, that maintains a running totalization of the actual number of pulses that have been generated with the latest number of pulses, i.e the value of variable A, that are to be generated during the current timing interval. Once this occurs, execution proceeds to block 540 which uses the value of variable A as an address into a look-up table stored in PROM 275 (see FIGS. 2A and 2B) to access the corresponding values, T2 and T3, that will be loaded into "frequency" timer TIMER2 and "gate" timer TIMER3. Next, as shown in FIGS. 5A and 5B, block 543 is executed to modify the values T2 and T3 for low flow rates by shifting these values to the left a number of positions equal to the value of variable DIV_FREQ. For flow rates producing more than 16 pulses per second, the value of DIV_FREQ is zero. Thereafter, execution proceeds to block 546 which, when executed, loads the values T2 and T3 into timers TIMER2 and TIMER3, respectively. Once this occurs, block 549 is executed to start both of these timers. Thereafter, execution proceeds to block 552. Blocks 552–570 are used to set the appropriate value of the loop counter. FREQ_LOOPCNT. In particular, block 552, when executed, stores the value of DIV_FREQ into temporary variable A. Block 556 is then executed to multiply the value of variable A (the value DIV_FREQ) by two. Thereafter, execution proceeds to decision block 560 which tests whether variable A has a value greater than zero. If the value of variable A is greater than zero thereby indicative of a low flow rate requiring a 1/32 or 1/16 reference timing window, then execution proceeds, via the YES path emanating from decision block 560, to block 564. This latter block decrements the value of variable A by one. Execution then proceeds to block 570 which, when executed, stores the resulting value in variable A into the loop counter, FREQ_LOOPCNT, for subsequent use. Alternatively, if the value of variable A is equal to zero, then decision block 560 merely routes execution via its NO path directly to block 570. Once block 570 has executed, execution returns from routine 500 back to main loop 400. Thus, it can be see that the number of pulses produced on the scaled frequency output can vary from one reference timing window to the next based upon the then current value of the non-remainder portion (upper byte) of the totalized mass flow variable, PULSE_ACCUM. For example, one 1/64 second reference timing window may have five pulses, the next four pulses, the following one or zero pulses and so on. However, by the time one second has elapsed, the number of pulses generated over 64 adjacent windows will be equal to the absolute number of pulses required thereby ensuring that the internally and externally generated totalized mass flow values will not substantially diverge, if at all, over time.

A flowchart of Tube Period Interrupt Routine 600, that is also executed as part of Main Loop 400, is collectively depicted in FIGS. 6A and 6B, for which the correct alignment of the drawing sheets for these figures is shown in FIG. 6. As noted, Tube Period Interrupt Routine 600 is executed once every two cycles of flow conduit (tube) movement to update the scaled frequency output.

Upon entry into routine 600, execution proceeds to block 605 which, when executed, disables all interrupts. Thereafter, block 610 is executed to read current up and down count data stored in counters C1 and C2 located within counters 234. Variable SINT1 stores the (up) count from counter C1; while variable SINT2 stores the (down) count from counter C2. All the interrupts are then enabled by execution of block 615. Once this occurs, the time constant value (TC) is read from NOV-RAM 270 (see FIGS. 2A and 2B). This value can be any one of several pre-defined values as selected by the user during system configuration and then stored in NOV-RAM for subsequent use. Thereafter, as shown in FIGS. 6A–6C, execution proceeds to block 625 to calculate the current $\Delta t$ value. This value is determined merely by subtracting the counts stored within counters C1 and C2 that have accumulated during the current measuring interval. However, since these counters are not reset at the beginning of any measuring interval, the contents of these counters that existed at the end of the interval, SINT1 and SINT2 are subtracted from the corresponding contents that existed at the beginning of the measuring interval, OLD_UP_COUNT and OLD_DOWN_COUNT, respectively. $\Delta t$ is then computed by taking the difference between these two values. Once this computation has been made, execution proceeds to block 628 which, when executed, saves the current counts as the OLD_UP_COUNT and OLD_DOWN_COUNT values for use during the next iteration through routine 600 for the next set of two measuring intervals.

Now, once a value of $\Delta t$ has been calculated, the value is then digitally filtered through two pole filter routine 630 that implements a digital filter having two identical poles. Specifically, upon entry into routine 630, execution proceeds to block 633 which, when executed, sets the value of temporary variable SLONG1 to the current value of $\Delta t$. Next, block 635 is executed to appropriately scale the value of SLONG1 by multiplying its value by the hex value "4000". Thereafter, execution proceeds to block 640 which sets the value of temporary variable SLONG2 to the value of variable OLD_DELTA_T. At this point, block 645 is executed to provide the first pole of digital filtering. The resulting digitally filtered value SLONG1 is then saved by execution of block 650 as variable OLD_DELTA_T for use during the next iteration through the routine 600. Next, block 655 executes to set the value of variable SLONG2 to the current value of variable NEXT_DELTA_T. Thereafter, execution proceeds to block 660 which provides a second pole of digital filtering. Identical filter equations are used in blocks 645 and 660. The resulting filtered value of SLONG1 is then saved within variable NEXT_DELTA_T by execution of block 665. As noted, the values of SLONG1, OLD_DELTA_T, SLONG2 and NEXT_DELTA_T are set to zero during initialization.

Once block 665 executes, digital filtering has been completed at which point execution proceeds from routine 630 to block 670. This block, when executed, subtracts out the current value of any mechanical offset determined during conditions of zero flow from the value of variable SLONG1, i.e. the digitally filtered Δt value. Thereafter, execution proceeds to block 675 which converts the Δt value stored in SLONG1 by multiplication by a rate conversion factor to yield flow rate (FLOAT1) measured in grams/second. Next, execution proceeds to decision block 680 which determines whether the current flow rate has a value less than a pre-determined low flow rate cutoff. If the current flow rate has such a value, then decision block 680 routes execution, via its YES path, to block 685 which, when executed, sets the value of variable FLOAT1, i.e. the current flow rate, to zero. Execution then proceeds to block 690 which loads the value of variable FLOAT1 into variable RATE for use by 64 Hz interrupt routine 500. Alternatively, if the current flow rate has a value equal to or greater than the low flow rate cutoff, then decision block 680 routes execution, via NO path 688, directly to block 690. Once block 690 has executed, block 695 is executed to update other process variables, if any, given the current mass flow rate value. Once this occurs, execution of routine 600 is complete at which point execution then returns from this routine to main loop 400.

Clearly, those skilled in the art recognize that, although the disclosed embodiment utilizes U-shaped flow tubes, flow tubes of almost any size and shape may be used as long as the tubes can be oscillated about an axis to establish a non-inertial frame of reference. For example, these tubes may include but are not limited to straight tubes, S-shaped tubes or looped tubes. Moreover, although the meter has been shown as containing two parallel flow tubes, embodiments having a single flow tube or more than two parallel flow tubes—such as three, four or even more —may be used if desired.

Although a single embodiment of the invention has been shown and described herein, many other varied embodiments that incorporate the teachings of the present invention can be readily fabricated by those skilled in the art.

We claim:

1. In a Coriolis mass flow rate meter, apparatus for providing a frequency output signal having output pulses with an approximate 50% duty cycle wherein the number of said pulses produced during a timing interval is proportional to measured mass flow rate, said apparatus comprising:

a Coriolis mass flow rate metering assembly;

means connected to said metering assembly for measuring mass flow rate of a fluid travelling through a flow conduit contained within the metering assembly and for producing a value proportional to the measured mass flow rate, wherein said measuring and producing means comprises:

means for determining, in response to the measured mass flow rate value, a corresponding number of output pulses that need to be produced during a current timing interval;

means for totalizing said number with prior values thereof to yield a totalized pulse count value wherein said totalized pulse count value has a first portion and a remainder portion;

a look-up table containing a plurality of first and second timing values, wherein each of said first timing values defines an "on" time for each of said output pulses to be produced during a timing interval and each of said second values defines an "on" time for a gate interval that is sufficiently long to encompass said number of output pulses to be produced during said timing interval;

means operative in response to the value of said first portion for accessing one of said first values and a corresponding one of said second values from said look-up table to yield first and second timing values; and means, responsive to said first and second timing values, for successively producing a stream of substantially square pulses as the output pulses on said frequency output signal during said gate interval occurring during said current timing interval, whereby said stream does not contain substantially any extraneous pulses.

2. The apparatus in claim 1 wherein said pulse stream producing means comprises:

first and second timers operative in response to said first and second timing values, wherein said first timer produces said square pulses and said second timer produces a gate pulse having an "on" time substantially equal to said gate interval; and a gate, responsive to said first and second timing signals, for applying said square pulses on said first timing signal to said frequency output signal during said gate interval.

3. The apparatus in claim 2 wherein said first and second timers produce pulses that, at the beginning of the interval, both start in a first logic state, and, at the conclusion of the interval, both terminate in a second logic state, wherein the first and second logic states are the same or different logic states.

4. The apparatus in claim 3 wherein said Coriolis metering assembly comprises:

at least one flow conduit; and means responsive to a drive signal for oscillating said flow conduit in a sinusoidal pattern.

5. The apparatus in claim 4 wherein said measuring and producing means further comprises:

means for sensing movement of said flow conduit caused by opposing Coriolis forces induced by passage of the fluid through said flow conduit and for producing first and second sensor signals responsive to the sensed movement of said flow conduit; and circuit means, responsive to said first and second sensor signals, for providing a value of the mass flow rate of said fluid, said circuit means comprising:

means, responsive to at least one of said sensor signals, for producing said drive signal;

means, responsive to said first and second sensor signals, for determining a time difference occurring between each of two measurement points located on a rising side of said first sensor signal with respect to a reference point situated on the second sensor signal and which temporally occurs between each of the two measurement points, wherein said time difference is a linear function of the value of the mass flow rate of the fluid passing through said flow conduit; and means, responsive to said determined time difference, for generating the mass flow rate value.

6. The apparatus in claim 5 wherein said Coriolis metering assembly further comprises first and second flow conduits, and wherein said movement sensing means further comprises means for sensing the movement of both of the flow conduits such that the first and second sensor signals are responsive to the sensed movement of both of the flow conduits.

7. The apparatus of claim 6 wherein said time difference determining means comprises:
  means for integrating said first and second sensor signals to produce first and second position signals;
  means for comparing said first and second position signals against pre-defined reference values to detect the occurrence of each of said two measurement points and said reference point;
  logic circuit means responsive to said comparing means for generating first and second control signals;
  first and second counters, responsive to said first and second control signals and clock pulses of a pre-defined frequency, for providing counted values representative of a first time interval occurring between said first measuring point and said reference point and a second time interval occurring between said reference point and said second measuring point.

8. The apparatus in claim 7 wherein said time difference determining means further comprises: means for obtaining said time difference in response to the counted values occurring for at least two sets of said first and second measuring points and said reference point occurring over two cycles of movement of said one of said flow conduits.

9. The apparatus in claim 8 wherein said measuring points are symmetrically situated on either sides of said reference point under conditions of no flow.

10. In a Coriolis mass flow rate meter for measuring mass flow rate of a process fluid travelling through a flow conduit contained within a Coriolis mass flow rate metering assembly and for producing a value proportional to the measured mass flow rate, a method for providing a frequency output signal having output pulses with an approximate 50% duty cycle wherein the number of said pulses produced during a timing interval is proportional to the measured mass flow rate, said method comprising the steps of:
  determining, in response to the measured mass flow rate value, a corresponding number of output pulses that need to be produced during a current timing interval;
  totalizing said number with prior values thereof to yield a totalized pulse count value wherein said totalized pulse count value has a first portion and a remainder portion;
  accessing, in response to the value of said first portion, one of first values and a corresponding one of second values from a look-up table to yield first and second timing values, wherein said look-up table has a plurality of first and second timing values with each of said first timing values defining an "on" time for each of said output pulses to be produced during a timing interval and each of said second values defining an "on" time for a gate interval that is sufficiently long to encompass a desired number of successive ones of said output pulses to be produced during said timing interval; and
  successively producing, in response to said first and second timing values, a stream of substantially square pulses as the output pulses on said frequency output signal during said gate interval occurring during said current timing interval, whereby said stream does not contain substantially any extraneous pulses.

11. The method in claim 10 further comprising the steps of:
  loading first and second timers with said first and second timing values so that said first timer produces said square pulses and said second timer produces a gate pulse having an "on" time substantially equal to said gate interval; and
  gating, in response to said first and second timing signals, said square pulses on said first timing signal to said frequency output signal during said gate interval.

12. The method in claim 11 further comprising the step of producing through said first and second timers pulses that, at the beginning of the interval, both start in a first logic state, and, at the conclusion of the interval, both terminate in a second logic state, wherein the first and second logic states are the same or different logic states.

13. The method in claim 12 further comprising the steps of:
  sensing movement of at least one flow conduit caused by Coriolis forces induced by passage of the fluid through said flow conduit and for producing first and second sensor signals responsive to said sensed movement of said flow conduit; and
  producing said drive signal in response to at least one of said sensor signals;
  oscillating said flow conduit in a sinusoidal pattern in response to said drive signal;
  determining, in response to said first and second sensor signals, a time difference occurring between each of two measurement points located on a rising side of said first sensor signal with respect to a reference point situated on the second sensor signal and which temporally occurs between each of the two measurement points, wherein said time difference is a linear function of the value of the mass flow rate of the fluid passing through said flow conduit; and
  generating, in response to said determined time difference, a measured value of the mass flow rate of said fluid.

14. The method of claim 13 wherein said movement sensing step further comprises the step of sensing the movement of first and second flow conduits such that the first and second sensor signals are responsive to the sensed movement of both of said flow conduits.

15. The method of claim 14 further comprising the step of updating a mass flow rate measurement after every two cycles of oscillatory movement of one of said flow conduits.

16. The method of claim 15 wherein said time difference determining step further comprises the steps of:
  integrating said first and second sensor signals to produce first and second position signals;
  comparing said first and second position signals against pre-defined reference values to detect the occurrence of each of said two measurement points and said reference point;
  generating first and second control signals in response to said comparing means;
  providing, in response to said first and second control signals and clock pulses of a pre-defined frequency, counted values representative of a first time interval occurring between said first measuring point and said reference point and a second time interval occurring between said reference point and said second measuring point.

17. The method in claim 16 wherein said time difference determining step further comprises the step of obtaining said time difference in response to the counted values occurring for at least two sets of said first and second measuring points and said reference point occurring over two cycles of movement of said one of said flow conduits.

18. The method in claim 17 wherein said measuring points are symmetrically situated on either sides of said reference point under conditions of no flow.

* * * * *